Jan. 8, 1924.

G. PETZEL 1,480,463

BODY FOR FILLING COLUMNS, TOWERS, ETC

Filed March 25, 1921

Inventor.
Gustav Petzel,
By B. Singer,
Atty.

Patented Jan. 8, 1924.

1,480,463

UNITED STATES PATENT OFFICE.

GUSTAV PETZEL, OF ZURICH, SWITZERLAND, ASSIGNOR TO THE FIRM GUSTAV WEINMANN, OF ZURICH, SWITZERLAND.

BODY FOR FILLING COLUMNS, TOWERS, ETC.

Application filed March 25, 1921. Serial No. 455,563.

*To all whom it may concern:*

Be it known that I, GUSTAV PETZEL, a citizen of the German Republic, residing at Usteristrasse No. 5, Zurich, Switzerland, have invented new and useful Improvements in a Body for Filling Columns, Towers, Etc. (for which I have secured a patent in Switzerland, No. 87,746), of which the following is a specification.

The present invention relates to bodies for filling devices for treating any liquid with a gas or any gases with a liquid comprising a column or a tower (Glover tower, scrubber distilling column, reaction-column, absorption column and the like) into which the liquid is introduced at the top and the gas at the bottom of the column or tower; the liquid and the gas passing in opposite directions.

One object of the invention is to insure intimate contact between the liquid and the gas and to maintain the said contact as long as possible.

Another object of the invention is to divide the streams of the liquid and of the gases equally over the whole cross-section of the column or tower.

A further object of my invention consists in the provision of means to deflect the flow of the gases and of the liquid as often as possible in such a manner that gas and liquid impinge on each other very frequently.

I attain these and further objects which are given below by means of bodies having star-shaped cross-section which are placed within the column or tower in an irregular manner. The bodies heaped up, having each a great number of corners and walls, divide the streams of the fluids; they afford a great contacting surface on which the fluids impinge securing thereby a complete splitting up of the streams without reducing the flow of the gases in a detrimental manner.

Figure 1:
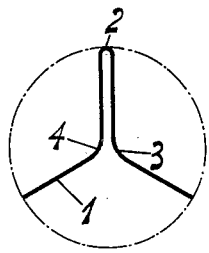
Figure 1A:
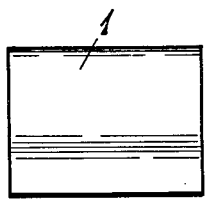

In the accompanying drawings several modes of construction are shown by way of examples each of the Figures 1, 2, 3, and 4 of the drawing being a cross-section through one form of the new filling body and Fig. 1ª being an elevation of the form of body shown in Fig. 1. Fig. 5 discloses a modified form of filling body.

The body shown in Fig. 1 is bent from a strip of sheet metal 1. The strip 1 is bent at 2 and each bent-off portion thereof is again bent at 3 and 4 in such a manner that three wings are produced which are of equal length and which are set at 120° from each other forming a three-pointed star. The length of the body 1 is about equal to the diameter of a circle having its centre at the point of intersection of the wings and passing through the outer points of the wings. The length may however vary in wide limits without reducing the desired action of the body in any material manner. One or all of the wings may be curved or may be provided with notches, holes or ridges whereby the number of edges is increased over which the fluid has to pass.

Figure 2:
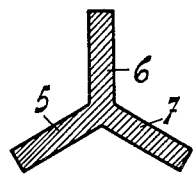

In Fig. 2 a body is shown which is cast of any suitable material, metal, porcelain, glass or which may be of terra cotta, glazed or unglazed brick material. The wings 5, 6, 7 are of equal length and have the same thickness but they may be made unequal.

Figure 3:
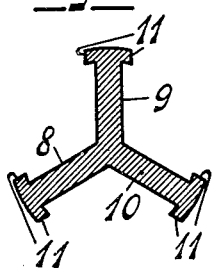

The body shown in Fig. 3 differs from that shown in Fig. 2 in that each wing 8, 9, 10 is provided at the outer end with ribs 11. It may be made of the same material as that described with reference to Fig. 2 and may be provided with holes, notches, etc.

Figure 4:
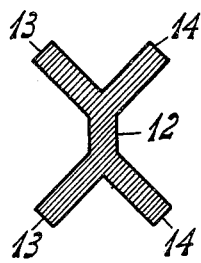
Figure 5:
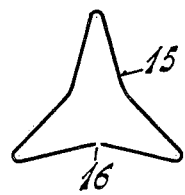

To increase the number of baffling planes to deflect the flow of the fluids the construction shown in Fig. 4 may be employed. From a common centre piece 12 two wings 13, 14 branch-off at each side. Each of the wings may be provided with holes, notches or ridges running in any direction.

Fig. 5 shows a body 15 which is bent of a strip of sheet metal to form a three-pointed star the edges of which meet each other at 16. The body is hollow, the space may be empty or filled in with any material.

Each form may be made partly or wholly of catalytic material or may be covered therewith, or its holes may be provided therewith in such a manner that the bodies assist in any desired chemical reaction.

When the bodies are heaped in any column or tower they assume such positions that interstices are formed through which the liquid and the gases pass freely, but each stream of fluid is very finely divided and very frequently deflected thus ensuring a good contact of the particles of the fluids with each other.

Various changes of form and dimensions may be made without departing from the spirit of my invention.

What I claim and wish to secure by Letters Patent is:

1. A body for filling columns, towers, etc., to enlarge the contacting surface of a liquid flowing in one direction and of a gas flowing in opposite direction having a number of wings arranged at suitable angles to each other the wings being provided with corners, the length of said body being approximately equal to the diameter of a cylinder encircling said body.

2. A body for filling columns, towers, etc., to enlarge the contacting surface of a liquid flowing in one direction and of a gas flowing in opposite direction having a number of wings arranged at suitable angles to each other the body being of sheet metal.

In witness whereof I affix my signature.

GUSTAV PETZEL.